United States Patent
Kim et al.

(10) Patent No.: US 10,085,144 B2
(45) Date of Patent: Sep. 25, 2018

(54) PEER TO PEER MOBILE USER EQUIPMENT COMMUNICATION WITH ON-DEMAND DISCOVERY SIGNAL TRANSMISSION

(71) Applicant: Apple Inc., Cupertino, CA (US)

(72) Inventors: Yuchul Kim, Santa Clara, CA (US); Xiaowen Wang, Cupertino, CA (US); Tarik Tabet, Los Gatos, CA (US); Dawei Zhang, Saratoga, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 14/870,763

(22) Filed: Sep. 30, 2015

(65) Prior Publication Data

US 2016/0100304 A1 Apr. 7, 2016

Related U.S. Application Data

(60) Provisional application No. 62/059,078, filed on Oct. 2, 2014.

(51) Int. Cl.
*H04W 8/06* (2009.01)
*H04W 76/14* (2018.01)
(Continued)

(52) U.S. Cl.
CPC ....... *H04W 8/005* (2013.01); *H04W 52/0241* (2013.01); *H04W 76/14* (2018.02);
(Continued)

(58) Field of Classification Search
CPC ... H04W 40/246; H04W 48/10; H04W 48/16; H04W 76/023; H04W 84/12; H04W 8/005; H04W 52/0241; H04W 76/14
See application file for complete search history.

(56) References Cited

U.S. PATENT DOCUMENTS

| 8,849,290 B2 | 9/2014 | Gao et al. |
| 2013/0010618 A1* | 1/2013 | Wang ............... H04W 8/005 370/252 |

(Continued)

*Primary Examiner* — Michael Thier
*Assistant Examiner* — Prince Akwasi Mensah
(74) *Attorney, Agent, or Firm* — Meyertons Hood Kivlin Kowert & Goetzel, P.C.; Jeffrey C. Hood; Brian E. Moore

(57) ABSTRACT

In some embodiments, a user equipment device (UE) implements a method for discovering the presence of neighboring UEs using an on-demand discovery signal transmission technique. This discovery process may be performed to enable the UEs to perform peer-to-peer communications with each other, wherein peer-to-peer communications is defined as direct communication between the UEs without involving a base station. The UE may be configured to transmit a discovery request signal when it has moved greater than a threshold amount since transmission of a prior discovery request signal. The discovery request signal causes one or more neighboring UEs to each transmit a discovery signal in response, and also causes the UE which generated the discovery request signal to transmit its own discovery signal. The received discovery signal from each of the neighboring UEs is useable to discover, or detect the presence of, these neighboring UEs.

20 Claims, 15 Drawing Sheets

(51) Int. Cl.
*H04W 8/00* (2009.01)
*H04W 52/02* (2009.01)

(52) U.S. Cl.
CPC .......... *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/26* (2018.01)

(56) References Cited

U.S. PATENT DOCUMENTS

| | | | |
|---|---|---|---|
| 2013/0069828 A1* | 3/2013 | Cheng | H04W 74/0891 342/458 |
| 2013/0109313 A1 | 5/2013 | Kneckt et al. | |
| 2014/0130137 A1* | 5/2014 | Baek | H04W 12/08 726/4 |
| 2014/0153444 A1* | 6/2014 | Zhou | H04W 40/12 370/256 |
| 2014/0241257 A1* | 8/2014 | Ding | H04W 48/08 370/329 |
| 2015/0017979 A1 | 1/2015 | Kang et al. | |
| 2015/0019726 A1* | 1/2015 | Zhou | H04W 48/10 709/224 |
| 2015/0085697 A1* | 3/2015 | Gulati | H04W 48/14 370/254 |
| 2015/0296443 A1* | 10/2015 | Lim | H04W 48/12 370/312 |
| 2015/0351018 A1* | 12/2015 | Kim | H04W 48/16 370/338 |

\* cited by examiner

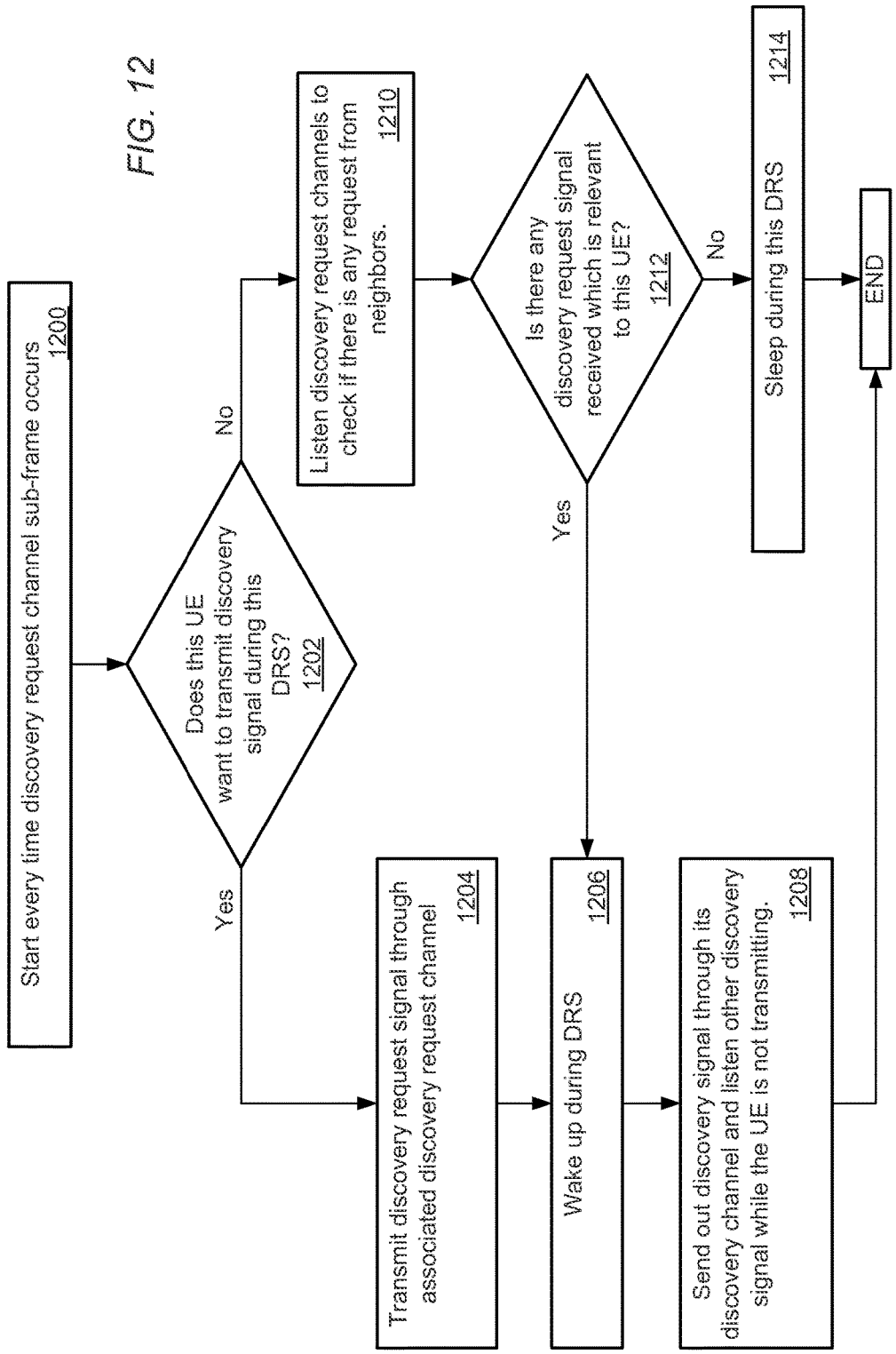

PEER TO PEER MOBILE USER EQUIPMENT COMMUNICATION WITH ON-DEMAND DISCOVERY SIGNAL TRANSMISSION

PRIORITY CLAIM

The present application claims benefit of priority of provisional application No. 62/059,078 titled "Peer to Peer Mobile User Equipment Communication with On-Demand Discovery Signal Transmission" and filed on Oct. 2, 2014, which is hereby incorporated by reference in its entirety as though fully and completely set forth herein.

FIELD

The present application relates to wireless cellular communication, including to methods for discovering neighboring User Equipment (UE) with reduced power requirements.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE.

One development in mobile device communications is peer-to-peer communications, where one UE can discover the presence of a neighboring UE and communicate directly with the neighboring UE in a peer-to-peer manner, i.e., without involvement of a base station. In wireless networks, the term "discovery" refers to the process of a UE finding or discovering neighboring UE's with which it can communicate. In current systems, UEs which use a broadcast based discovery mechanism are constantly transmitting and listening for discovery signals to keep their neighbor status up to date, irrespective of the existence of listeners/neighbors. This can waste the battery of the UE in situations where there is not much new information exchange among UEs.

Therefore, improvements in the field would be desirable.

SUMMARY

Embodiments are presented herein of, inter alia, a user equipment (UE) and associated method for discovering the presence of neighboring UEs using an on-demand discovery signal transmission technique. This discovery process may be performed to enable the UEs to perform peer-to-peer communications with each other, wherein peer-to-peer communications is defined as direct communication between the UEs without involving a base station. A UE may comprise at least one antenna for performing wireless cellular communication, at least one radio coupled to the antenna that performs cellular communication, and one or more processors coupled to the radio.

The UE may be configured to transmit a discovery request signal over a discovery request channel, which may be a shared discovery request channel. The discovery request channel may be at the beginning of a discovery resource set (DRS), i.e., a set of contiguous discovery resources or sub-frames. A UE may transmit a discovery request signal in response to determining that the UE has moved greater than a threshold amount since transmission of a prior discovery request signal. In other words, a UE may not transmit a discovery request signal when the UE has been stationary or has moved less than a threshold amount since its last transmission of a discovery request signal.

The UE may transmit the discovery request signal either when: 1) it desires to broadcast its own discovery signal through its discovery channel; or 2) when the UE desires to trigger its neighbor UEs to send out their discovery request signals. The discovery request signal is configured to cause one or more neighboring UEs to each transmit a discovery signal in response, and also causes the UE which generated the discovery request signal to transmit its own discovery signal. In some embodiments, UEs may listen only for certain relevant discovery request signals and hence only broadcast their discovery signals in response to detection of a relevant discovery request signal.

In response to transmitting its discovery request signal, the UE may receive a discovery signal from each of the one or more neighboring UEs. The received discovery signal from each of the neighboring UEs is useable to discover, or detect the presence of, these neighboring UEs. The discovery request signal may be transmitted in a discovery request channel that occurs in a first sub-frame of a discovery resource set, and discovery signals from each of the neighboring UEs may be received in subsequent sub-frames of the discovery resource set. If a UE does not hear or detect any relevant discovery request signals, the UE may sleep during the remainder of the discovery resource set (DRS).

In one embodiment, UEs perform this discovery process to become aware of the presence of other neighboring UEs for the purpose of performing peer-to-peer communication with neighboring UEs after discovery. For example, a software application executing on the UE may cause the discovery process to occur, so that the software application can discovery neighboring UEs for peer-to-peer communication. The discovery request channel used by a UE may be determined based on the application type (or application category) of the software application that is currently running on the UE and which is performing the discovery process. For example, the discovery request channel may be selected based on one or more of an application type, an application ID, or an application user ID. In another embodiment, the discovery request channel may be selected based on a hash of an identifier (discovery identifier) of the software application. Alternatively, a hybrid approach may be used which uses both the application type and a hash of the application's discovery identifier.

Thus each UE may be configured to monitor one or more relevant discovery request channels in a discovery resource set. Each UE may determine whether any discovery request signals are received on the relevant discovery request channels which are relevant to the UE. Here the relevant discovery request channels being monitored, and the relevance of discovery request signals detected, may be based on the application type of the software application currently executing on the UE, or other criteria. The UE may transmit a discovery signal on a discovery channel in the discovery resource set in response to detecting a relevant discovery request signal. Each respective UE's discovery signal is useable by other UEs in discovering the presence of the respective UE. A UE is configured to sleep for a remainder of the discovery resource set in response to determining that no relevant discovery request signals have been detected.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 12 is a flowchart diagram illustrating a UE performing an example wake up and sleep operation;

FIG. 14 illustrates an example embodiment where a single discovery request channel is shared among all of the UEs, where each UE is assigned at least one discovery channel (DC);

FIG. 15 illustrates an example embodiment where a dedicated request channel is assigned to each discovery channel;

Figure 1:
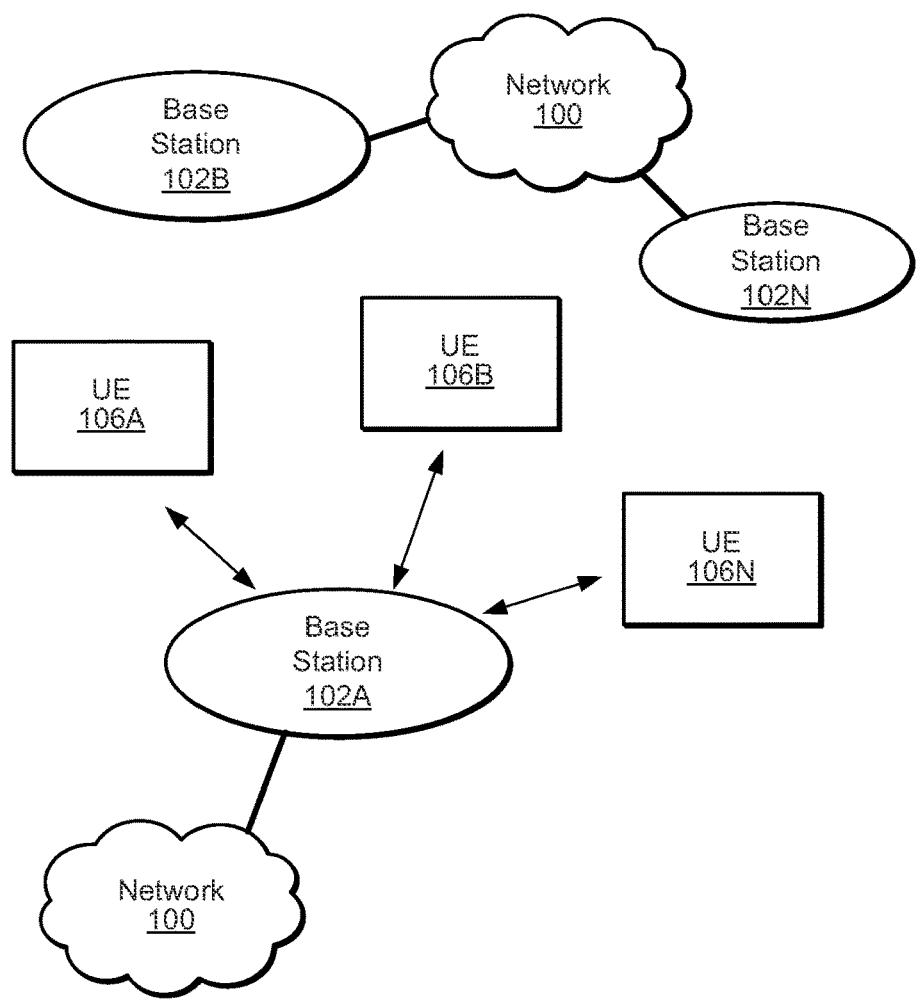
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates one embodiment of a wireless cellular communication system. It is noted that FIG. 1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
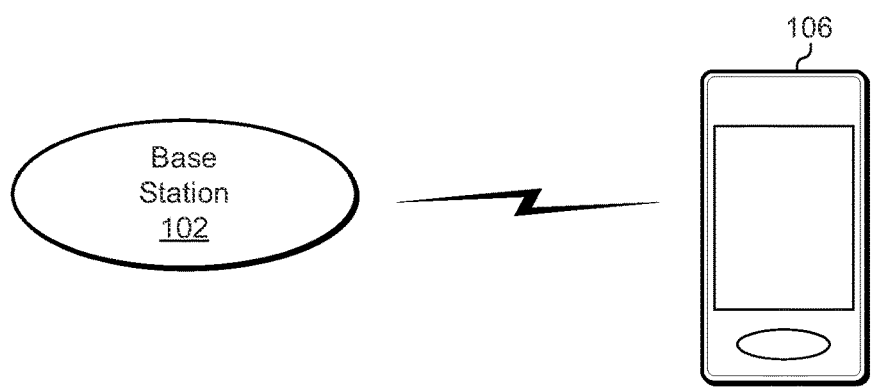
FIG. 2 illustrates an example base station ("BS", or in the context of LTE, an "eNodeB" or "eNB") in communication with a wireless device.

FIG. 2 illustrates UE device 106 (e.g., one of the devices 106A through 106N) in communication with base station 102. The UE device 106 may have cellular communication capability, and as described above, may be a device such as a mobile phone, a hand-held device, a media player, a computer, a laptop or a tablet, or virtually any type of wireless device.

The UE device 106 may include a processing element, such as a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
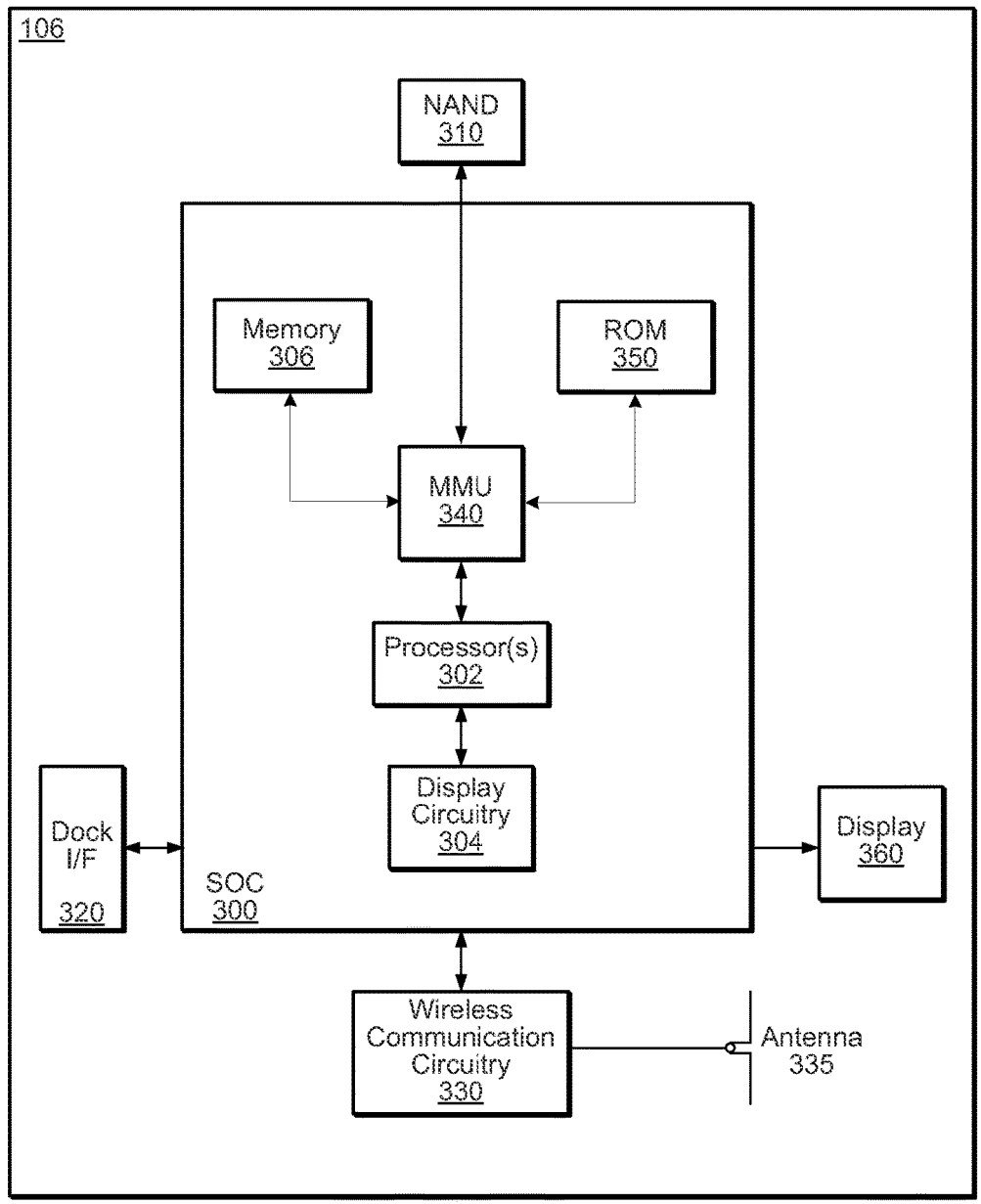
FIG. 3 illustrates a block diagram for an example implementation of a User Equipment (UE)

FIG. 3—Example Block Diagram of a UE

FIG. 3 illustrates one possible block diagram of a UE 106. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 360.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including Flash 310), a connector interface 320 (e.g., for coupling to a computer system), the display 360, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing discovery methods according to embodiments of this disclosure.

The processing element (e.g., processor) 302 of the UE device 106 may be configured to implement part or all of the methods described herein, e.g., by executing program instructions stored on a memory medium (e.g., a non-transitory computer-readable memory medium). In other embodiments, processing element may be configured as a programmable hardware element, such as an FPGA (Field Programmable Gate Array), or as an ASIC (Application Specific Integrated Circuit).

Figure 4:
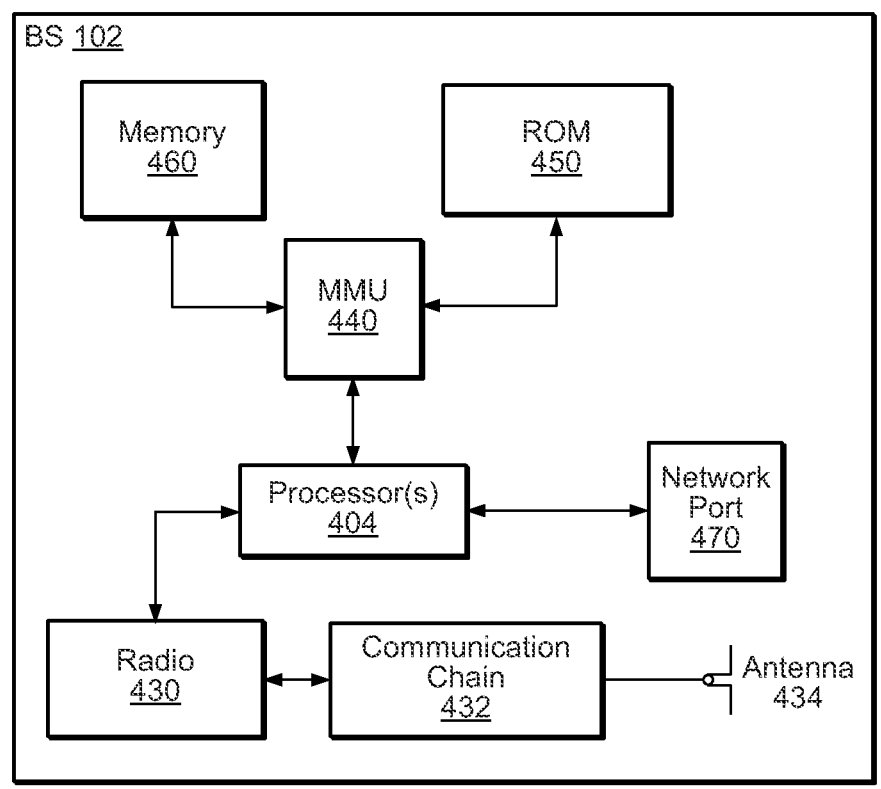
FIG. 4 illustrates a block diagram for an example embodiment of a base station.

FIG. 4—Example Block Diagram of a Base Station

FIG. 4 illustrates one embodiment of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

As described above, in some embodiments a UE is able to directly communicate with a neighboring UE in a peer-to-peer fashion, i.e., the UE's are able to communicate directly with each other without the communications being required to pass through a base station. For UEs which are configured to perform peer-to-peer communication, these UEs may use a discovery mechanism that is based on broadcasting signals to neighboring UEs. In other words, a first UE may broadcast a signal that may be received by neighboring UEs, thus alerting the neighboring UEs to the presence of the first UE. In a similar manner, each of the UEs may broadcast a signal to alert neighboring UEs of its presence.

One issue that arises is that UEs may keep sending and listening for discovery signals to keep their neighbor status (their information on neighboring UEs) up to date, irrespective of the existence of listening/neighboring UEs, or changes in the presence of listeners/neighbors. This could result in a waste of battery usage when there is little or no new information exchange among UEs.

Therefore, one embodiment of this disclosure relates to an on-demand approach based on request and responses. This on-demand approach may be more energy efficient than conventional methods. More specifically, one embodiment of the method relates to request-based discovery signal transmission, wherein the UE may send out a discovery signal only when there is a request from any of its neighbors. A second embodiment relates to category-based discovery request channels, wherein the request may be categorized and transmitted through shared category-based request channels to reduce unnecessary or spurious discovery signal transmission.

Figure 5:
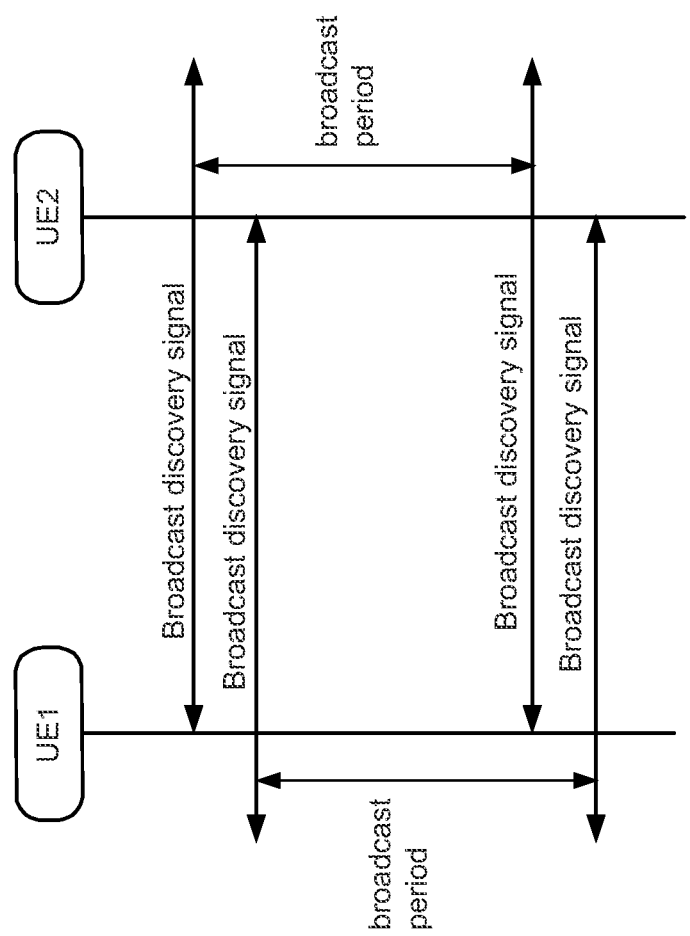
FIG. 5 illustrates an example of UEs broadcasting discovery signals to discover neighboring UEs.

FIG. 5—Current Discovery Method

FIG. 5 illustrates a conventional method for performing discovery of neighboring UEs in a wireless network. In wireless networks, discovery is the process of finding neighboring nodes or UEs, e.g., for the purpose of enabling peer-to-peer communication between the UEs. As shown, UE1 and UE2 periodically broadcast discovery signals though their respective discovery resource. UE1 discovers UE2 if it receives the broadcasting discovery signal from UE2. In a similar manner, UE2 discovers UE1 if UE2 receives the broadcasting discovery signal from UE1. These signals may be transmitted through orthogonal resources to avoid collisions and hence help ensure successful reception. As shown, the broadcast period is the time period between a respective UE's broadcast of a discovery signal.

Figure 6:
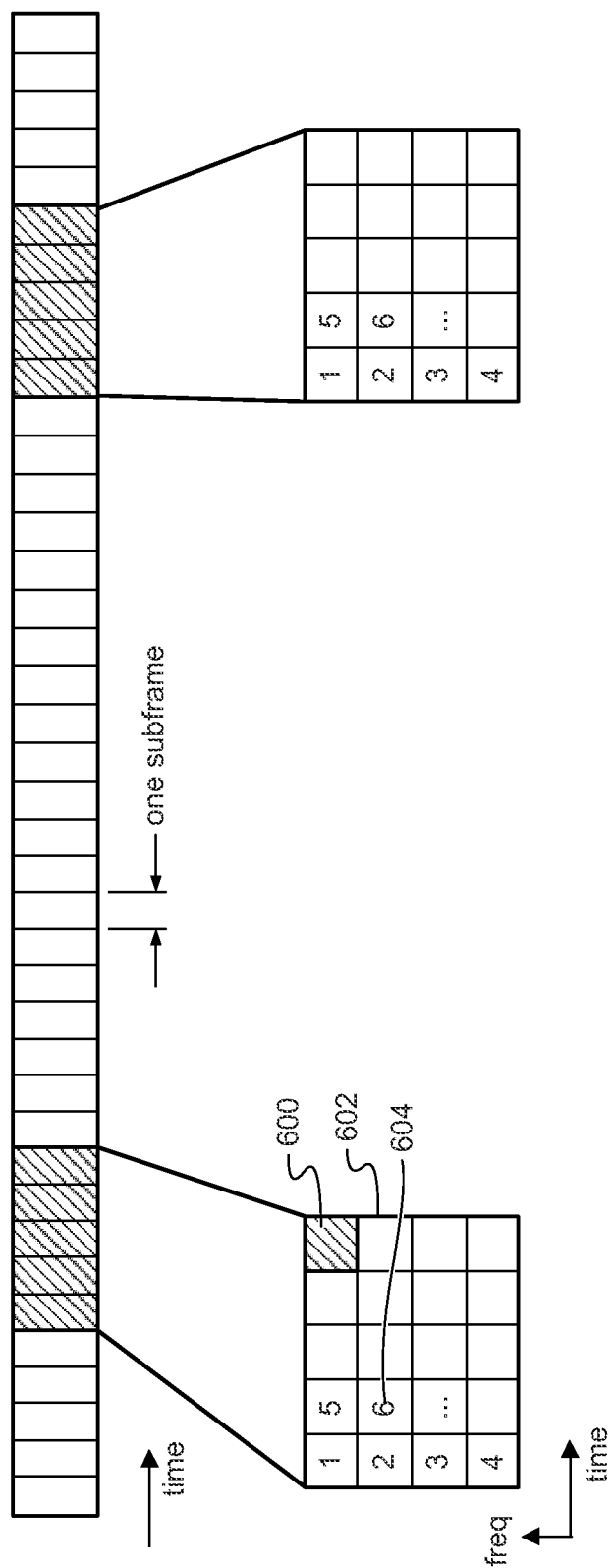
FIG. 6 illustrates the discovery resources in an example discovery channel of a UE.

FIG. 6—Resources Used for Discovery

FIG. 6 illustrates an example of resources used for discovery communication according to one embodiment. The embodiment shown in FIG. 6 assumes half duplex communication. Here the basic transmission time unit is a sub-frame, and the top of FIG. 6 shows a sequence of sub-frames in the time domain, where each rectangle in the sequence corresponds to a sub-frame. Each of the shaded portions of the sequence is a set of Discovery Resources, i.e., a Discovery Resource Set (DRS). As shown, a set of discovery resources comprises a set of sub-frames in the larger sequence of sub-frames.

Each respective DRS is broken out and shown in greater detail in FIG. 6 in the square below. The square shows a 2-D grid of boxes where each box represents a Discovery Resource (DR) in the DRS. For the 2-D grid of DRs, the horizontal axis is time and the vertical axis is frequency. Thus, as shown, each DRS comprises a set of Discovery Resources (DRs), where each Discovery Resource (DR) is a set of time-frequency resources reserved to send a discovery signal from one UE to others. An example of time-frequency resources is, e.g., one or more RBs (resource blocks) in LTE. A Discovery Resource Set (DRS) is thus a set of neighboring DRs, i.e., a set of neighboring sub-frames that are allocated for the purpose of discovery resources.

A Discovery Channel (DC) is a logical channel which is mapped to one respective DR in each DRS. Thus the box in the lower left of FIG. 6 illustrates a Discovery Resource Set comprising a number of Discovery Resources, where the number inside each box indicates a corresponding Discovery Channel number. In conventional systems, each UE in the discovery process keeps sending out its discovery signal through its assigned discovery channel regardless of the presence or status of neighboring UEs. This results in waste of power and reduced battery life.

In one embodiment UEs may perform a periodic wake-up to engage in the discovery process. In other words, a UE periodically wakes up to either send a discovery request signal, monitor discovery channel(s) for other discovery request signals, or monitor discovery signals transmitted by other UEs, and also sends its own discovery signal when requested to do so. A periodic wake-up for discovery results in fast battery consumption, which eventually could reduces device standby time significantly.

In a stationary network where UEs are stationary or moving very slowly, it is likely that UEs in the network continue receiving the same discovery information over and over. In this type of scenario, a UE sending the same discovery information to the same set of neighbors and receiving the same discovery information from them would waste battery power without exchange of new information among UEs. Thus in such stationary networks, sending or receiving a discovery signal less often can save battery power.

Figure 7:
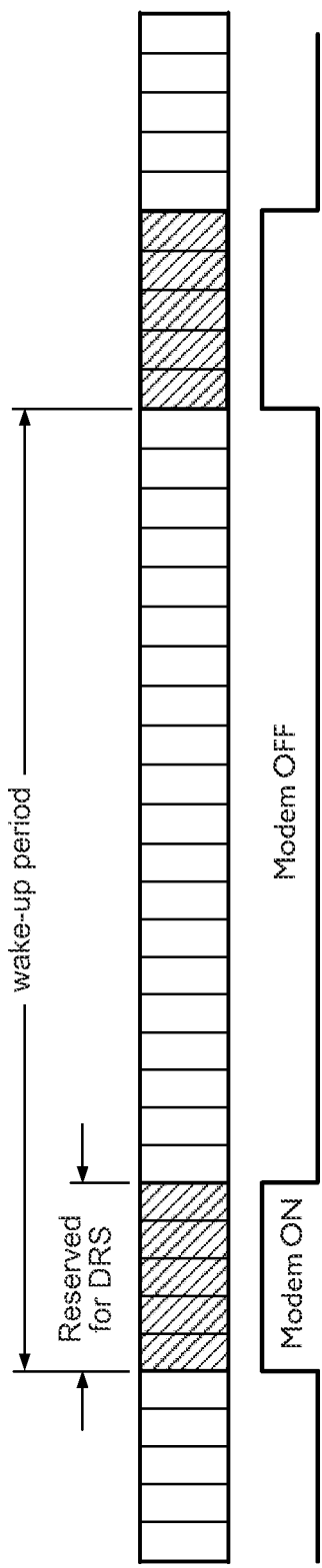
FIG. 7 illustrates a conventional method which increases the length of the wake-up period for discovery signal transmission.

FIG. 7—Increased Wake-Up Period

FIG. 7 illustrates one approach for reducing power consumption, where this approach involves increasing the wake-up period between instances of the discovery process. The top of FIG. 7 shows a time sequence of sub-frames, with each shaded portion allocated for a set of Discovery Resources, i.e., a Discovery Resource Set (DRS). With the increase of wake-up period, the discovery resource sets (DRS's) are spaced farther apart in time, and hence each of the UEs wakes up less often, and thus each can save battery power. However, this is achieved at the expense of increased discovery delay (since inter wake-up time is larger). Furthermore, heretofore it has not been possible to dynamically adjust the length of the wake-up period depending on the number of UEs in the network or the mobility of UEs in the network. Thus improvements in the field are desired.

One embodiment described herein relates to a demand-based discovery process which results in reduced power consumption. As one example, a UE may send out discovery request signal through a shared discovery request channel in the following two cases:

1) when the UE wants to send its own discovery signal through its discovery channel, and/or 2) when the UE wants to trigger its neighbors to send out their discovery signals.

UEs not sending a discovery request signal should listen to the various discovery request channels. For the respective UEs listening on the discovery request channels, in response to receipt of any relevant discovery request signal, each respective UE should broadcast its own discovery signal in response thereto. Thus, when a first UE broadcasts a discovery request signal, the neighboring UEs that receive the discovery request signal respond with their respective discovery signals. When UEs do not hear any discovery request signals on a respective discovery request channel, i.e., when no discovery request signal is transmitted on a respective discovery request channel for a DRS, the UEs may sleep during this discovery process, i.e., may sleep during this DRS.

Figure 8:
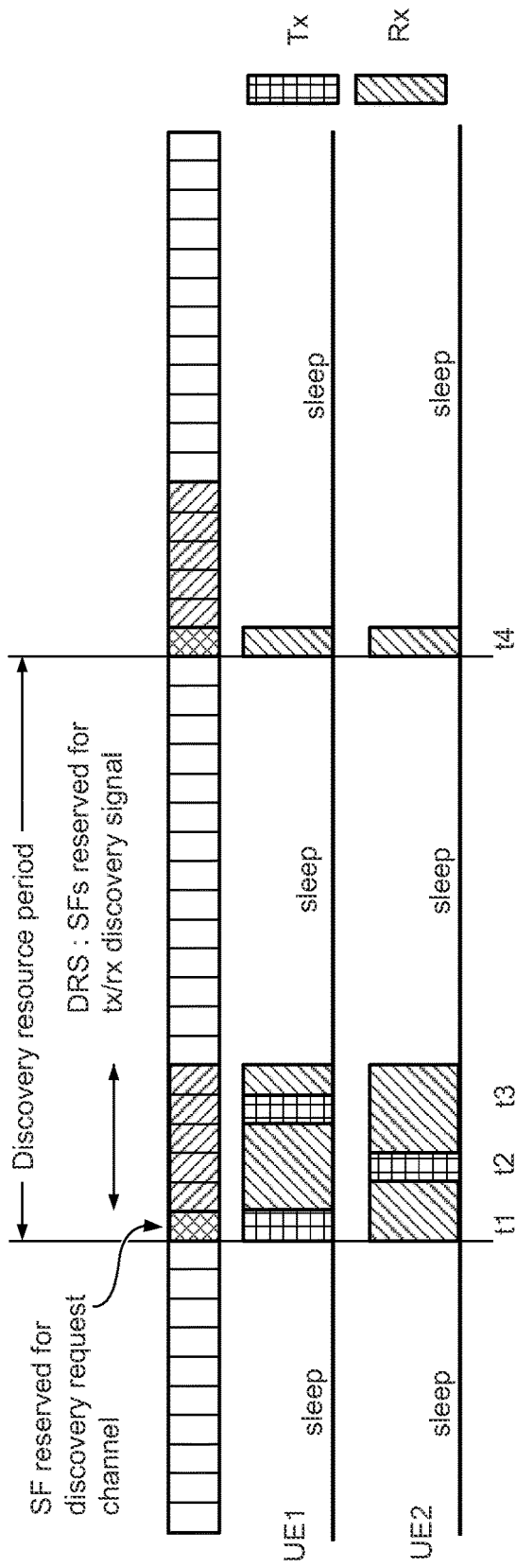
FIG. 8 illustrates one embodiment of an example method for on demand discovery signal transmission.

FIG. 8—Example of the Demand-Based Discovery Process

FIG. 8 illustrates an example of the demand-based discovery process according to one embodiment. The top of FIG. 8 shows a time sequence of sub-frames, with this illustrated sequence of sub-frames having two different discovery resource sets (DRS's). Each DRS is illustrated as hatched portions corresponding to a set of discovery resources (DRs), i.e., sub-frames that are allocated as DRs, or as a DRS. The first DR in each set, which is shown with a fully hatched shading, is a sub-frame reserved for a discovery request channel. The remaining DRs of the DRS, which have diagonal hatching in only one direction, are sub-frames that are reserved for transmit/receive of a discovery signal by respective UEs, in response to a discovery request signal. FIG. 8 also illustrates the Discovery Resource (DR) period between respective Discovery Resource Sets (DRSs).

Below this sequence of sub-frames, FIG. 8 illustrates operation of UE1 and UE2. Here presume that UE1 and UE2 each has its own discovery resource and discovery request channel assigned by the eNB. The operations of UE1 and UE2 at times t1-t4 are as follows:

t1: UE1 sends out a discovery request signal on the discovery request channel to trigger its neighbors to broadcast. The discovery request channel is the first sub-frame of the DRS, and this transmission is shown with horizontally and vertically hatched shading.

t1: UE2 listens to the discovery request signal from UE1 on the discovery request channel.

t2: UE2 sends out its own discovery signal, on its assigned discovery resource, in response to the discovery request signal.

t3: UE1 also sends out its discovery signal for its neighbors.

t4: Both UE1 and UE2 listen on the discovery request channel of the next DRS. There is no discovery request signal that is transmitted on the discovery request channel of this next DRS, and thus UE1 and UE2 sleep during the DRS.

Figure 9:
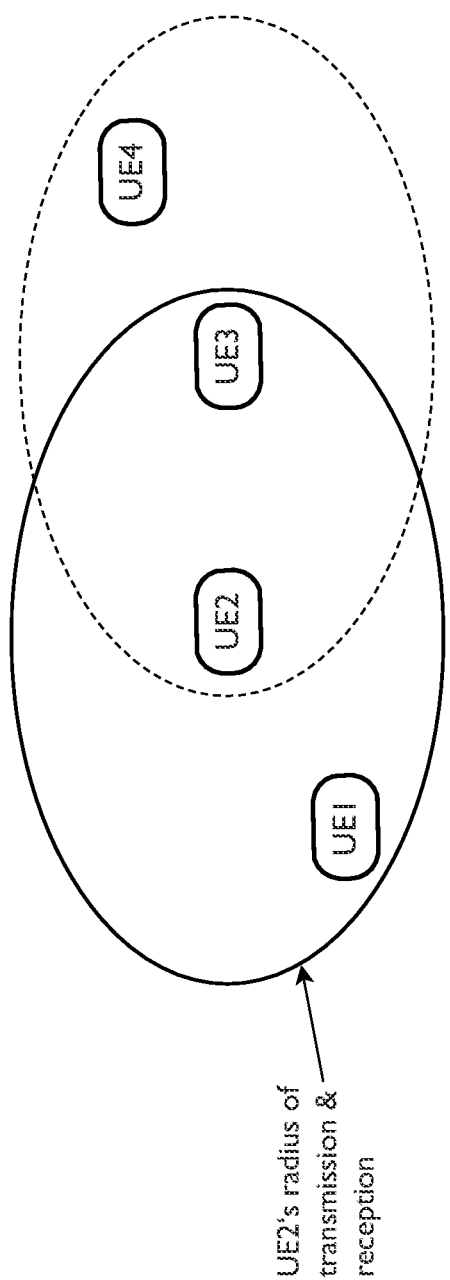
FIG. 9 illustrates an example transmission and reception radius of a UE locality of the wake-up procedure.

FIG. 9—Locality of Wake-Up

FIG. 9 illustrates locality of the wake-up that is performed. In one embodiment, a UE wakes up only when it detects a discovery request signal from one or more of its neighbors. Thus if the UE does not have any neighbors, then there is no discovery signal transmission that occurs. In one embodiment, a first UE is considered to have a neighbor when there is another UE that is within the first UE's transmission and reception radius. Thus a respective UE is a neighboring UE of a first UE if the respective UE is within the transmission/reception radius of the first UE.

Consider the example of FIG. 9 and assume UE1 and UE3 are the neighbors of UE2, and UE2 and UE4 are the neighbors of UE3. If UE2 sends a discovery request signal, only UE1 and UE3 are capable of listening to or detecting the request. In response to UE2 transmitting the discovery request signal, UE1, UE2, and UE3 wake up and transmit their discovery signal during the DRS. UE4 sleeps during the DRS since it did not receive the discovery request signal from UE2.

Figures 10, 11:
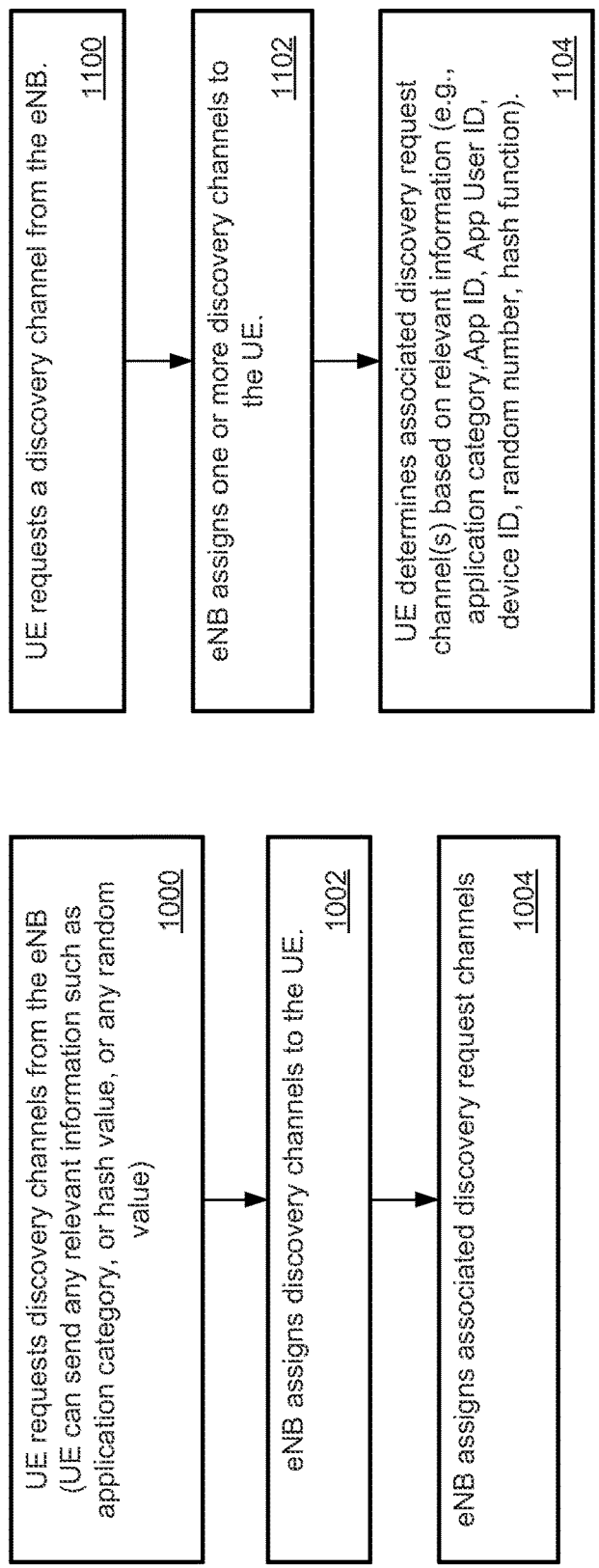
FIG. 10 is a flowchart diagram illustrating example discovery channel assignment by the base station.
FIG. 11 is a flowchart diagram illustrating an example method for a UE determining a discovery request channel based on discovery information.

FIG. 10—Explicit Assignment of Discovery Channel by Base Station

FIG. 10 is a flowchart diagram illustrating one embodiment of a method for assignment of a discovery channel to a UE by a base station.

At 1000 the UE requests one or more discovery channels from the eNB (base station). At 1000 the UE may be executing a software application that utilizes or requires peer-to-peer communication with other UEs. Examples of such software applications include geocaching or geotagging applications, game applications which utilize lots of communication between neighboring UEs participating in the respective game, social media applications which perform communications based on geographic proximity, messenger applications, advertising applications which provide advertising based on geographic proximity, file transfer applications, accessory or utility applications, and any of various other types of apps which may utilize peer-to-peer communications between neighboring UEs. Thus this software application executing on the UE may request various discovery channels or resources to use in performing discovery of neighboring UEs. This request may take the form of a control signaling from the UE to the eNB. In making the request for discovery channels, the UE may send any relevant information such as application category, or hash value, or any random value, or other types of information.

At 1002 the base station assigns one or more discovery channels to the UE, e.g., for use by the software application executing on the UE. The base station may assign discovery channels to the UE through a Radio Resource Control (RRC) message or other types of control signaling. Here the base station may assign a particular discovery resource in a discovery resource set to the UE (or to the app executing on the UE) to use for transmission of its discovery signal.

At 1004 the base station assigns one or more associated discovery request channels to the UE (or to the app executing on the UE). The base station may assign one or more associated discovery request channels to the UE based on information that the UE has provided, such as the application type (or application category) of the software application, a hash value of a unique identifier (discovery identifier) associated with the software application, or a random number. The hash value or a random number may be used to assign a discovery request channel, such that the pool of discovery request channels are assigned in a more uniform manner, i.e., to prevent overuse of certain channels and under-use of others. Hash-based mapping is discussed in more detail below.

The method of FIG. 10 may be performed for each of one or more of, or a plurality of, software applications executing on a respective UE.

FIG. 11—UE Determines Discovery Request Channel Based on Discovery Information

FIG. 11 is a flowchart diagram illustrating another embodiment of a method whereby a UE requests one or more discovery request channels from a base station. In this embodiment, the UE may determine the discovery request channels it should use based at least in part on certain information associated with the UE or applications executing on the UE.

At 1100 the UE requests one or more discovery channels from the eNB (base station). This step may be similar to, or the same as, 1000 of FIG. 10, discussed above.

At 1102 the base station assigns one or more discovery channels to the UE. This step is the same as 1002 of FIG. 10, discussed above.

At 1104 the UE determines its associated discovery request channel(s) based at least in part on relevant information (e.g., application category, App ID, App User ID, device ID, random number, hash function, etc.). It is noted that some or all of this information may be signaled by the UE. For example, assume a first software application is executing on the UE which performs the method of FIG. 11. When the UE receives discovery request channel assignment information from the base station at 1102, at 1014 the UE may use information related to the first software application, such as its application category (application type), application ID, and/or application user ID, to determine the appropriate discovery request channels to be assigned. As noted above, a hash function or random number methodology may also, or instead, be used to help ensure that discovery request channel assignments are spread evenly among the available discovery request channels.

FIG. 12—Wake-Up and Sleep Operation

FIG. 12 is a flowchart diagram illustrating a method for wake-up and sleep operation according to one embodiment. The method of FIG. 12 may be performed by each UE, e.g., by each of a plural subset of UEs in a neighborhood. Here it is presumed that a respective UE is executing a software application that employs some form of peer-to-peer communication, and in addition the software application uses a discovery procedure as described herein to enable the respective UE to discover, or be aware of the presence of, other UEs in its neighborhood. The discovery procedure may enable the respective UE to discover other UEs that are executing a similar software application. Thus, for example, in a respective geographic area, in one embodiment only UEs that are executing a certain software application may participate in the discovery methods described herein. In other embodiments, all UEs in a certain geographic area may execute the methods described herein, regardless of what software applications they are currently executing.

As shown, at 1200 every time a discovery request channel sub-frame occurs, the method, e.g., a first UE, may perform the following operations. As noted above, a discovery request channel may occur at the beginning of a discovery resource set (DRS), e.g., as the first sub-frame of a DRS.

At 1202 the UE determines if it wants to transmit a discovery signal during the DRS. This determination may be based on whether the UE has moved greater than a threshold amount since the last time it transmitted its discovery signal. This movement threshold amount may any of various predetermined distances of movement since the last discovery transmission, such as 100/200/500 meters. For example, if the UE has been relatively stationary since the last time it transmitted its discovery signal, then the UE likely will not transmit its discovery request signal. In this instance, other UEs that previously received this UE's last discovery signal, and which have not since moved away, will already be aware of this UE's presence. It is also presumed that new UEs entering the neighborhood of this UE will have sent a discovery request signal due to their movement, causing this UE to have previously responded with its discovery signal.

If the UE determines that it does want to transmit its discovery signal at 1202, then at 1204 the UE transmits a discovery request signal through its associated discovery request channel in the respective DRS. This discovery request signal causes the UE to transmit its own discovery signal in its assigned discovery channel in the DRS. This discovery request signal also acts as a trigger that causes other UEs in its neighborhood to respond with their discovery signals.

At 1206 the UE wakes up during the DRS. Here the UE wakes up during the DRS because it transmitted its discovery request signal in 1204. In other words, because the UE has transmitted its discovery request signal in 1204, it wakes up during the DRS at 1206.

At 1208 the UE transmits its discovery signal through its discovery channel. This discovery signal can be detected by other UEs in the neighborhood of this UE, thus enabling these other UEs to discover, or detect the presence of, this UE. At 1208 the UE also listens for or monitors the transmission of other discovery signals during the time in the DRS when the UE is not broadcasting its own discovery signal. In other words, the UE monitors other discovery channels in the DRS, i.e., listens in on other discovery resource sub-frames in the DRS, to detect other UEs in its neighborhood that are transmitting their discovery signals based on the UE's transmission of its discovery request signal in 1204.

If the UE determines that it does not want to transmit its discovery signal at 1202, then at 1210 the UE monitors or listens for discovery request signals on various of the discovery request channels. In one embodiment, the UE listens for discovery request signals on all possible discovery request channels. In another embodiment, if a certain software application (of a certain application type or category) is executing on the UE which performs this discovery method, then this software application may only listen to a subset of the discovery request channels associated with the same or similar application type as that of the software application executing on the UE.

At 1212 the UE determines if there is any discovery request signal detected or received which is relevant to this UE. For example, the UE may determine if there is any detected discovery request signal that has the same application type as that of the application which is currently executing on the UE, and which is controlling or implementing the discovery process.

If at 1212 the UE determines that there is a discovery request signal detected or received which is relevant to this UE, then operation proceeds to 1206, and steps 1206 and 1208 are executed as described above. Here the UE will wake up during the DRS in 1206 and at 1208 will both transmit its discovery signal through its assigned discovery channel and will also monitor and detect discovery signals transmitted by other UEs. Thus the UE will be able to discover the presence of other UEs in its neighborhood that are broadcasting their discovery signals.

If at 1212 the UE determines that there is not a discovery request signal detected or received which is relevant to this UE, then at 1214 the UE sleeps during the DRS, thus saving power.

Figure 13:
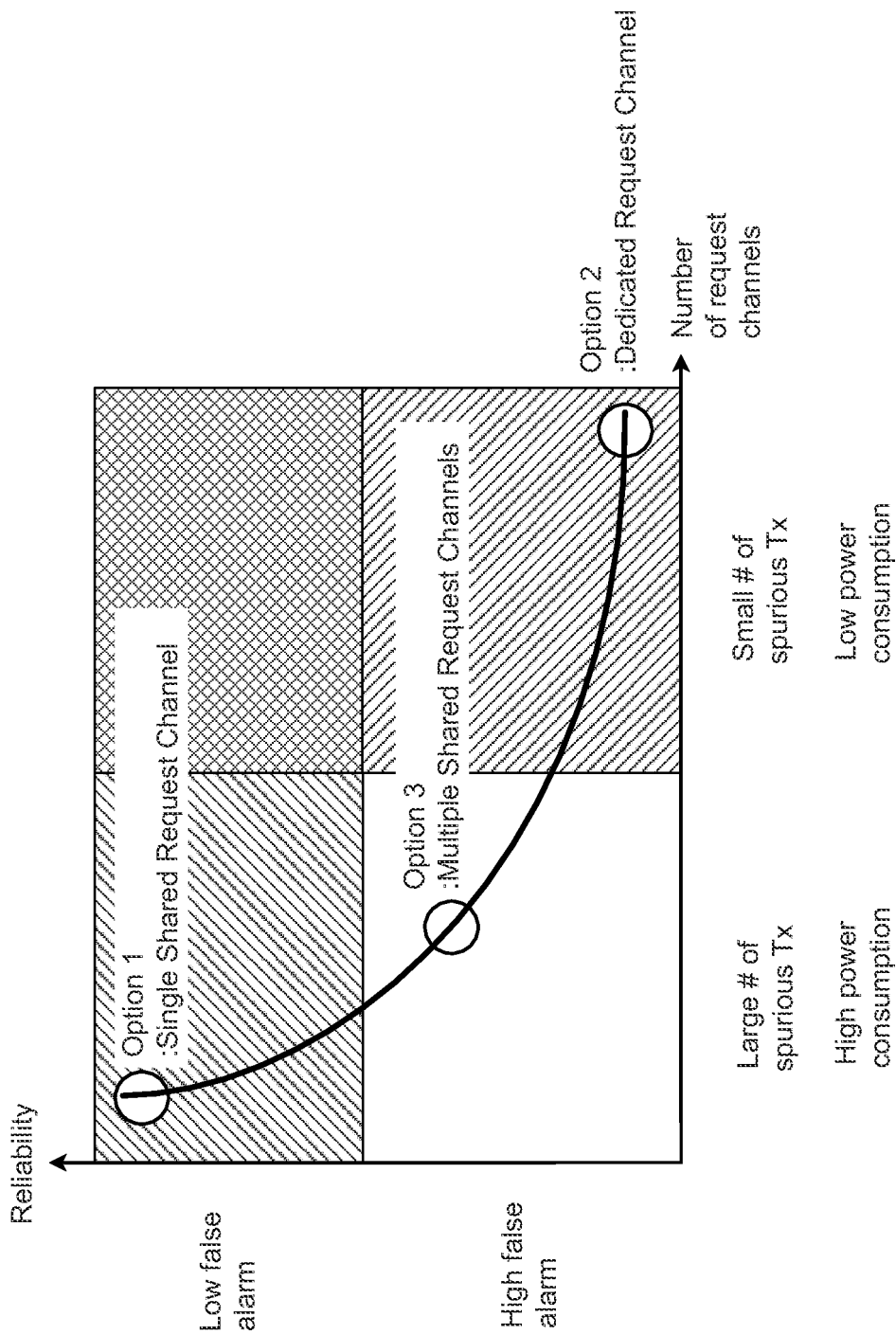
FIG. 13 is an example graph illustrating the trade-off between the number of discovery request channels and reliability.

FIG. 13—Design of Discovery Request Channels

One objective in the design of discovery request channels is to design reliable request channel(s) that may reduce power consumption of the UE. In order to achieve reduced power consumption, in one embodiment a first UE may wake up only when any neighboring UE indicates that it wants to listen to the first UEs' discovery signal. As shown in FIG. 13, in designing the discovery channels, various metrics were considered, such as reliability and power consumption. Reliability may be measured by false alarm (FA)/miss detection (MD) probability. FA/MD could be caused by multi-path fading, Doppler, noise, interference, etc. Power consumption may be measured by the number of spurious transmissions (or unnecessary discovery signal transmissions). Spurious transmission occurs when a UE sends a discovery signal transmission that is not used by any of the UE's neighbors. The design of the discovery request channels may take into account the trade-off between the number of channels vs. reliability.

Figures 14, 15:
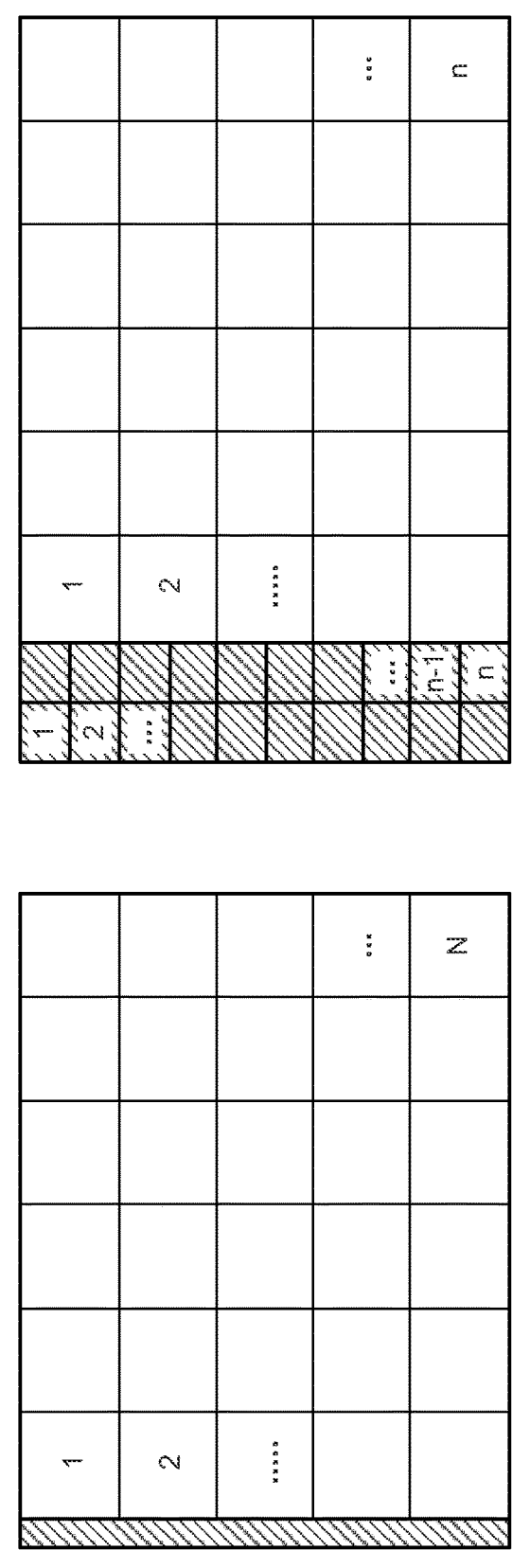

FIG. 14 shows Option 1 with a single shared discovery request channel. In this implementation, one single discovery request channel is shared among all the UEs, where each of the UEs is assigned at least one discovery channel for responding to a discovery request. This implementation has the benefit of high reliability. However, some of the negatives are that if there is at least one UE transmitting on the shared discovery request channel, then this one UE wakes up all the UEs in its neighborhood and requires them to transmit on their respective discovery channels. However, many of these UEs in the neighborhood may not be of interest to this UE, resulting in spurious transmission. Also, there is not much opportunity for power saving. Thus, as shown in FIG. 13, with Option 1 using a single shared request channel there is a low probability of false alarm but also a larger number of spurious transmission signals and a higher power consumption.

FIG. 15 shows Option 2 with a dedicated discovery request channel for each UE. In FIG. 15 the shaded boxes on the left correspond to sub-frames reserved for discovery request channels. In this implementation, the system (e.g., the base station) assigns one dedicated discovery request channel for each discovery channel, and hence for each UE. This implementation has the benefit of no collisions among request signals, since there is a dedicated request channel for each discovery channel and thus each UE. However, this implementation requires a large number of orthogonal request channels, which in conjunction with effects such as multi-path fading, Doppler, noise, interference, etc., can result in low reliability of the dedicated request channels. Another drawback of Option 2 is that use of dedicated discovery channels may entail the use of a one bit indicator for each channel, which does not provide information about what discovery information will be transmitted. Thus, since a UE is only receiving one bit ("yes" or "no"), a UE should have prior knowledge about its neighbors, such as discovery channel numbers of UEs of interest or some form of IDs which could be mapped to discovery channels. Thus, with Option 2 using a dedicated request channel for each UE, there is a higher probability of false alarm but also a smaller number of spurious transmission signals and a lower power consumption.

Figure 16:
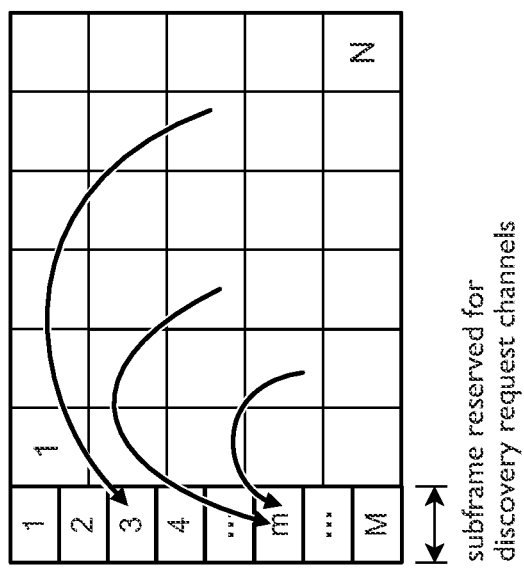
FIG. 16 illustrates an example embodiment involving multiple shared discovery request channels, where each discovery request channel is shared by one or more UEs who are assigned at least one DC.

FIG. 16 shows Option 3 with multiple shared request channels. In FIG. 16 the shaded boxes on the left correspond to sub-frames reserved for discovery request channels. In Option 3 each discovery request channel may be shared by one or more, and typically two or more, UEs, wherein each of the UEs is assigned at least one discovery channel. Thus Option 3 uses multiple shared request channels, i.e., more than a single shared request channel but not a dedicated request channel for each UE. For example, assume M is the number of discovery request channels and N is the number of discovery resources, then M<N. Thus as shown in FIG. 13 Option 3 makes a trade-off between power consumption and the number of spurious transmission signals on the one hand vs. reliability of the discovery channel, e.g., the number of false alarms and mis-detections, on the other hand. Various methods may be used for mapping discovery channels to discovery request channels.

Figure 17:
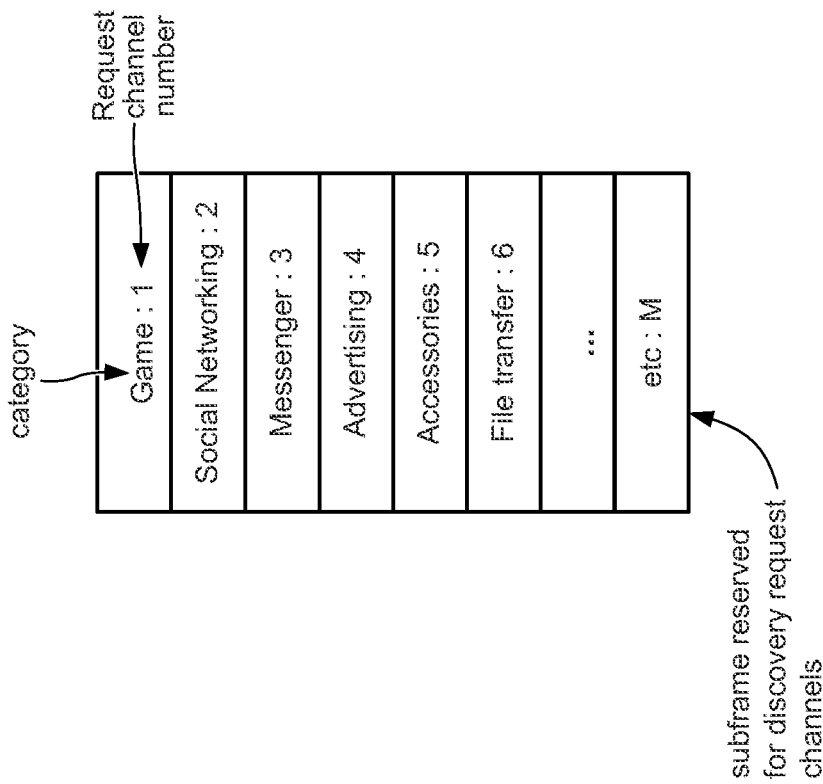
FIG. 17 illustrates an example method of category-based mapping, where discovery signals from apps with the same category have the same request channel number.

FIG. 17—Application Type Based Request Channel Mapping

FIG. 17 illustrates an example of category-based (application type-based) mapping according to one embodiment. In FIG. 17 each of the rectangular boxes represents a sub-frame reserved for discovery request channels. In this embodiment, all of the discovery signals from applications (apps) of the same category (same application type) utilize the same discovery request channel number. FIG. 17 illustrates an example where game applications use request channel number 1, social networking applications use request channel number 2, messenger applications use request channel number 3, advertising applications use request channel number 4, accessory applications use request channel number 5, file transfer applications use request channel number 6, etc. It is noted that some request channels may be more popular than others, resulting in an uneven or non-uniform usage (and hence possibly inefficient usage) of the request channel numbers. A benefit of this category based mapping is the UEs may only be required to wake up when application types in which the UE is interested are scheduled to be transmitted. A drawback of this category based mapping is that if a UE is configured to listen to a very popular category (application type), e.g., due to the type of application currently running on the UE, then there is very little opportunity for power saving.

Figure 18:
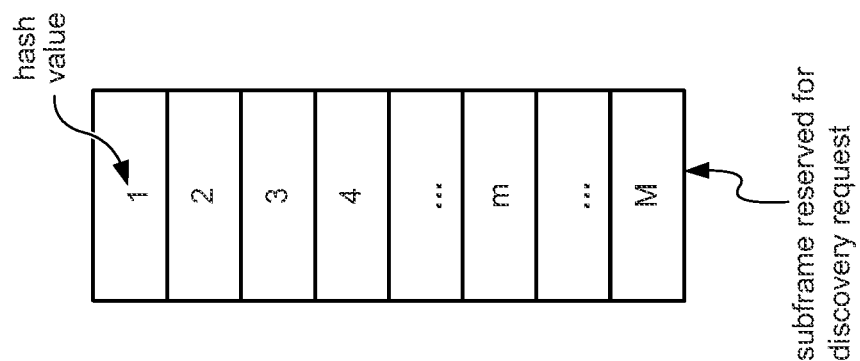
FIG. 18 illustrates an example method of hash-based mapping, where each UE or application in the UE that has at least one assigned discovery request channel has a unique value called a discovery identifier (DI) which is used for information filtering by receive UEs.

FIG. 18—Hash Based Mapping

FIG. 18 illustrates an example of hash-based mapping according to one embodiment. In FIG. 18 each of the rectangular boxes represents a sub-frame reserved for discovery request channels. In this embodiment, each UE, or each application in the UE, which has at least one DR assigned has a unique value called discovery identifier (DI) which is used for information filtering by receive UEs. The discovery identifier (DI) may take the form of other types of values. For example, one or more values such as application ID, user ID, application type (or category), etc. may be used instead of a DI The DI is hashed to one value m of the request channel numbers 1, M, where:

$$m = \text{Hash}(DI_1, DI_2, \text{ with } 1 \le m \le M; \text{ and}$$

$DI_1$, $DI_2$, ... are mapped to discovery request channel m.

In hash based mapping all of the discovery request channels are equally popular. One benefit of hash-based mapping is that spurious transmission rate becomes proportional to the total number of UEs transmitting. One drawback of hash-based mapping is that spurious transmission increases as the total number of UEs transmitting discovery signals increases.

Figure 19:
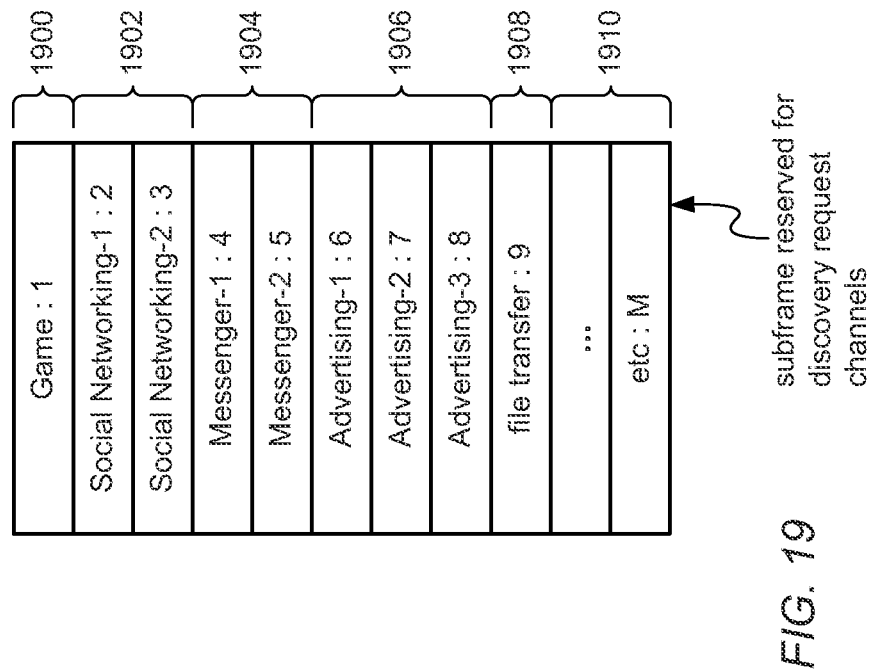
FIG. 19 illustrates an example hybrid approach which involves both category-based and hash-based mapping.

FIG. 19—Hybrid Type and Hash Based Mapping

FIG. 19 illustrates an example of a hybrid form of mapping using a combination of category based (application type based) mapping and hash-based mapping according to one embodiment. In FIG. 19 each of the rectangular boxes represents a sub-frame reserved for discovery request channels.

In this embodiment both category and hash-based mapping are used, and each discovery request channel is identified by application category and hash value. The "category" is determined by application type and the "hash value" is determined by DI (or other values as described above). In this implementation, the number of discovery request channels for each category may depend on the popularity of the category. For example, a non-popular category may have only one assigned request channel (or a single hash value). A popular category may have two or more assigned request channels. One benefit of this hybrid-based mapping is that spurious transmissions are further reduced. One drawback of this hybrid-based mapping is that more request channels are required, which could reduce the reliability of an individual request channel. Also, it is not possible to completely remove spurious transmissions.

Figure 20:
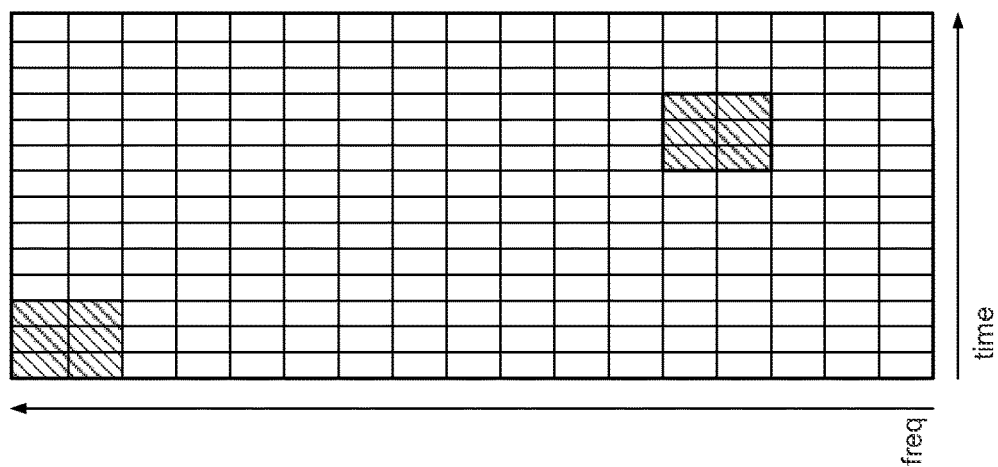
FIG. 20 illustrates an example of a physical design of discovery request channels.

FIG. 20—Physical Design of Discovery Request Channels

FIG. 20 illustrates an example of the physical design of discovery request channels. FIG. 20 illustrates a plurality of sub-frames, where the shaded portions represent discovery request channels. The design objectives for discovery request channels may be to have a large number of channels with a sufficiently high reliability. These discovery request channels may exist in both the time and frequency domains. In implementations where a shared channel is used, multiple UEs having the same (category, hash value) could send the same discovery request signal through the same channel. In one embodiment, the discovery request channels are distributed in the frequency domain for diversity. Each channel may be composed of a set of resource elements (REs) which is distributed over the entire time frequency resource.

Figure 21:
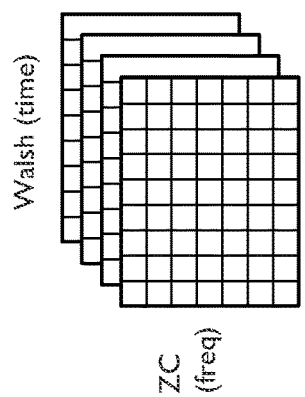
FIG. 21 illustrates an example of orthogonal discovery request channels.

FIG. 21 illustrates the use of orthogonal request channels. As one example, this embodiment may use a Zadoff Chu sequence in the frequency domain and a Walsh Hadamard sequence in the time domain. With this scheme, it is possible to create multiple orthogonal channels in a given time-frequency resource (e.g., one resource block). The total number of channel multiplexed though one time frequency resource block may be K*L, where K is the number of cyclic shifts in the ZC sequence, and L is the number of orthogonal Walsh sequences.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processing element, e.g., a processor or a set of processors and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna for performing wireless cellular communication;
   at least one radio communicatively coupled to the at least one antenna, wherein the at least one radio is configured to perform cellular communication using at least one radio access technology (RAT);
   one or more processors communicatively coupled to the at least one radio, wherein the one or more processors and the at least one radio are configured to perform wireless voice and/or data communications using the at least one antenna;
   wherein the one or more processors and at least one radio are configured to:
      receive one or more discovery channels from a base station;
      transmit, in response to determining that the UE has moved greater than a threshold amount since transmission of a prior discovery request signal to neighboring UEs, a discovery request signal over a discovery request channel to the neighboring UEs, wherein the discovery request signal is configured to cause one or more of the neighboring UEs to transmit a discovery signal in response thereto, and wherein the threshold amount comprises a specified distance since the transmission of the prior discovery request signal; and
      receive, over at least one of the one or more discovery channels, discovery signals from one or more of the neighboring UEs in response to transmission of the discovery request signal;
   wherein the received discovery signals from one or more of the neighboring UEs are useable to discover one or more of the neighboring UEs.

2. The UE of claim 1,
   wherein the one or more processors and at least one radio are further configured to:
      perform peer-to-peer communication with at least one of the neighboring UEs after discovering one or more of the neighboring UEs using the received discovery signals.

3. The UE of claim 1,
   wherein, in response to determining that the UE has not moved greater than the threshold amount since the transmission of the discovery request signal, the one or more processors and at least one radio are further configured to not transmit another discovery request signal.

4. The UE of claim 1,
   wherein the discovery request channel occurs in a first sub-frame of a discovery resource set;
   wherein the discovery signals from one or more of the neighboring UEs are received in subsequent sub-frames of the discovery resource set.

5. The UE of claim 4,
   wherein the one or more processors and at least one radio are further configured to transmit the UE's discovery signal in the discovery resource set in response to transmitting the discovery request signal over the discovery request channel;
   wherein the one or more processors and at least one radio are configured to listen to received discovery signals from one or more of the neighboring UEs in the discovery resource set when it is not transmitting the UE's discovery signal.

6. The UE of claim 1,
   wherein the UE further comprises a memory which stores a software application that is executable by the one or more processors;
   wherein transmission of the discovery request signal over the discovery request channel is performed by the software application; and wherein the discovery signals received from one or more of the neighboring UEs are used by the software application for peer-to-peer communication between the UE and at least one of the neighboring UEs.

7. The UE of claim 6,
wherein the shared discovery request channel is a first shared discovery request channel of a plurality of possible shared discovery request channels;
wherein the first shared discovery request channel corresponds to an application type of the software application executing on the UE.

8. The UE of claim 6,
wherein the shared discovery request channel is a first shared discovery request channel of a plurality of possible shared discovery request channels;
wherein the one or more processors and at least one radio are further configured to select the first shared discovery request channel based on one or more of an application type, an application ID, or an application user ID.

9. The UE of claim 1,
wherein the UE further comprises a memory which stores a plurality of software applications that are each executable by the one or more processors, wherein each of the plurality of software applications comprises an identifier;
wherein the one or more processors and at least one radio are further configured to use a respective identifier of an executing software application of the plurality of software applications in selecting the discovery request channel for transmission of the discovery request signal.

10. The UE of claim 1,
wherein the one or more processors and the at least one radio are further configured to:
request one or more discovery channels from the base station.

11. The UE of claim 1,
wherein the discovery request channel is assigned to the UE by the base station.

12. A method for providing improved communication performance in a cellular communication system, the method comprising:
performing by a user equipment (UE),
receiving one or more discovery channels from a base station;
transmitting, in response to determining that the UE has moved greater than a threshold amount since transmission of a prior discovery request signal to neighboring UEs, a discovery request signal over a discovery request channel to the neighboring UEs, wherein the discovery request signal is configured to cause one or more of the neighboring UEs to transmit a discovery signal in response thereto, and wherein the threshold amount comprises a specified distance since the transmission of the prior discovery request signal; and
receiving, over at least one of the one or more discovery channels, discovery signals from one or more of the neighboring UEs in response to transmission of the discovery request signal;
discovering one or more of the neighboring UEs based on the received discovery signals from the one or more neighboring UEs; and
communicating with at least one of the neighboring UEs discovered in said discovering in a peer-to-peer manner.

13. The method of claim 12,
wherein said transmitting, said receiving, said discovering, and said communicating are performed while executing a software application on the UE;
wherein the software application uses peer-to-peer communication between UEs.

14. The method of claim 12,
at a time after said transmitting, said receiving, and said discovering, performing, by the UE,
listening on one or more discovery request channels for any discovery request signals from neighboring UEs;
determining if a discovery request signal is received that is relevant to the UE;
transmitting a discovery signal on its discovery channel in response to determining that a discovery request signal is received that is relevant to the UE; and
listening for discovery signals from other UEs when the UE is not transmitting.

15. The method of claim 14,
wherein said listening is performed in a discovery resource set;
the method further comprising performing, by the UE,
entering a sleep state during the discovery resource set in response to determining that, during the discovery resource set, a discovery request signal is not received that is relevant to the UE.

16. A user equipment (UE) device, comprising:
at least one antenna for performing wireless cellular communication;
at least one radio coupled to the at least one antenna, wherein the at least one radio is configured to perform cellular communication using at least one radio access technology (RAT);
one or more processors coupled to the at least one radio, wherein the one or more processors and the at least one radio are configured to perform wireless voice and/or data communications using the at least one antenna;
wherein the one or more processors and at least one radio are configured to:
monitor one or more discovery request channels in a discovery resource set, wherein the one or more discovery request channels are assigned to the UE by a base station;
determine that the UE has moved greater than a threshold amount since transmission of a prior discovery request signal to neighboring UEs, wherein the threshold amount comprises a specified distance since the transmission of the prior discovery request signal to the neighboring UEs;
determine whether a discovery request signal relevant to the UE is received from one or more of the neighboring UEs on the discovery request channels; and
transmit a discovery signal on a discovery channel in the discovery resource set in response to one of determining that the discovery request signal relevant to the UE is received and determining that the UE has moved greater than a threshold amount since transmission of the prior discovery request signal;
wherein the discovery signal is useable by the neighboring UEs in discovering a presence of the UE.

17. The UE of claim 16,
wherein the one or more processors and at least one radio are further configured to listen for discovery signals from one or more of the neighboring UEs during the discovery resource set when the UE is not transmitting.

18. The UE of claim 16, wherein the one or more processors and at least one radio are further configured to sleep for a remainder of the discovery resource set in response to determining that no discovery request signals were received on the discovery request channels which are relevant to the UE.

19. The UE of claim 16, wherein the UE further comprises a memory which stores a software application that is executable by the one or more processors; wherein the one or more discovery request channels being monitored is based on one or more of an application type of the software application or a hash of an identifier of the software application, wherein the software application executing on the UE configures the one or more processors and at least one radio to monitor the one or more discovery channels.

20. The UE of claim 16, wherein, in response to determining that the UE has not moved greater than the threshold amount since the transmission of the discovery request signal, the one or more processors and at least one radio are further configured to not transmit another discovery request signal.

* * * * *